C. STEEN.
Shovel Plow.
No. 58,500.
Patented Oct. 2, 1866.
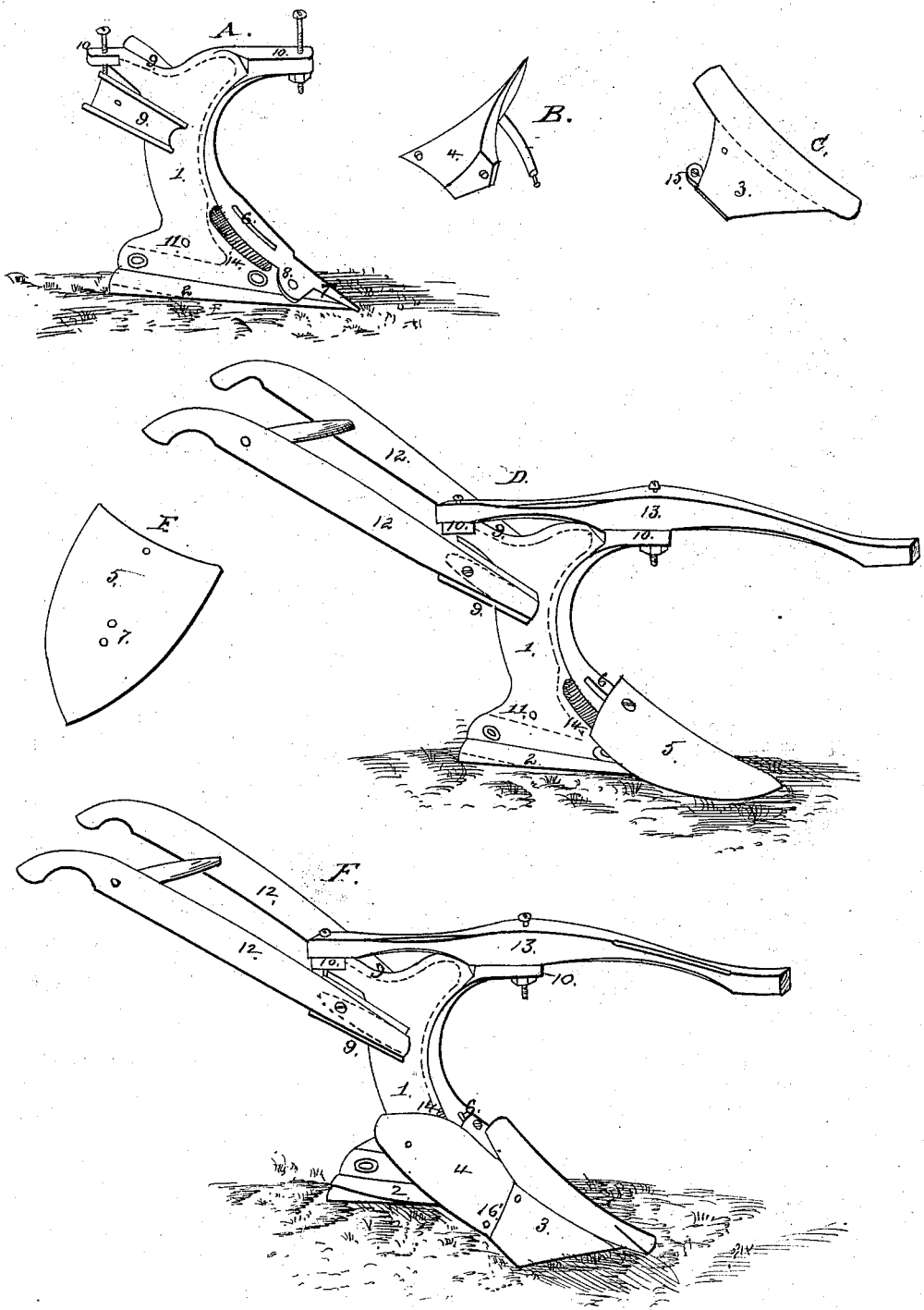
Witnesses:
Henry T. Brown
Thos. F. Wildes
Inventor:
Clinton Steen

UNITED STATES PATENT OFFICE.

CLINTON STEEN, OF ATHENS, OHIO.

IMPROVEMENT IN PLOWS.

Specification forming part of Letters Patent No. 58,500, dated October 2, 1866.

*To all whom it may concern:*

Be it known that I, CLINTON STEEN, of Athens, Athens county, State of Ohio, have invented a new and useful Improvement in Plows, being a combination of the shovel-plow and No. 1 mold-board plow by the novel construction of the knee, so as to receive either the shovel or the mold-board and point; and I declare that the following is a full, clear, and exact description of the construction and operation of the same, reference being had to the annexed drawings, making a part of this specification, in which—

Figure A is a perspective view of the knee. Fig. B is the mold-board. Fig. C is the point. Fig. F is the plow complete with mold-board and point attached, and Fig. D is the plow complete with the shovel attached, the Figs. F and D showing also the novel mode of attaching the handles to the combination-plow.

I. The shovel-plow, as shown by Fig. D: The shovel is held in position by bolt passing through near the top and through slot-hole 6, secured by nut in slot-hole 14 and by teat 7, fitted into countersink 7 in the under side of shovel, Fig. E, and when in place appearing as in Fig. D. The shovel is given two positions, viz: first, low and flat on the point of the knee by placing the teat 7 in the upper countersink, in which position the earth is simply loosened up and broken; second, higher up on the knee by placing the teat 7 in the lower countersink, in which position the earth is thrown from the furrow by the shovel in passing.

II. The No. 1 mold-board plow, as shown by Fig. F: The mold-board 4 is held in place by bolt passing through it and slot-hole 6, secured by nut in slot-hole 14 and the brace B, which is attached by bolt to the knee at 11, Fig. A, the lower side resting on the cape 8, and is further secured by the bolt 16. The point is attached and held in place by bolts through cape 8, and the lower outside corner of the mold-board and the cape 15, Fig. C, with nuts beneath.

III. The handles, as shown by Figs. D and F: 12 are attached by bolting through the semi-cylindrical lugs 9, secured by nuts behind the lugs.

What I claim as my invention, and desire to secure by Letters Patent, is—

The novel construction of the plow-knee and the mode of attaching the handles, as set forth in the above specification.

CLINTON STEEN.

Witnesses:
HENRY T. BROWN,
THOS. F. WILDES.